United States Patent [19]
Buehren et al.

[11] Patent Number: 5,255,775
[45] Date of Patent: Oct. 26, 1993

[54] APPARATUS FOR INDIVIDUALLY ORIENTING TEXTILE PACKAGES IN RESPONSE TO SENSING OF THE INITIAL ORIENTATION OF THE PACKAGE

[75] Inventors: Heinz Buehren; Alfred Schmitz; Norbert Bohnen, all of Moenchengladbach, Fed. Rep. of Germany

[73] Assignee: W. Schlafhorst AG & Co., Moenchengladbach, Fed. Rep. of Germany

[21] Appl. No.: 869,796

[22] Filed: Apr. 16, 1992

[30] Foreign Application Priority Data

Apr. 16, 1991 [DE] Fed. Rep. of Germany ....... 4112435

[51] Int. Cl.⁵ .............................................. B65G 47/24
[52] U.S. Cl. .................................... 198/395; 198/400; 242/35.5 A
[58] Field of Search ................. 198/391, 395, 396, 399, 198/400, 443, 444, 465.1, 487.1, 803.12; 242/35.5 A

[56] References Cited

U.S. PATENT DOCUMENTS

| | | | |
|---|---|---|---|
| 3,276,566 | 10/1966 | Raasch | 198/443 |
| 3,531,016 | 9/1970 | Pray | 198/400 |
| 3,698,536 | 10/1972 | Pray | 198/803.12 |
| 4,138,009 | 2/1979 | Strong | 198/396 |
| 4,747,482 | 5/1988 | Sanno | 198/803.12 |
| 4,838,019 | 6/1989 | Ueda | 242/35.5 A |
| 5,050,723 | 9/1991 | Herzog | 198/400 |

FOREIGN PATENT DOCUMENTS

| | | | |
|---|---|---|---|
| 2201013 | 7/1973 | Fed. Rep. of Germany | 198/400 |
| 3345825 | 6/1985 | Fed. Rep. of Germany | . |
| 3912602 | 10/1990 | Fed. Rep. of Germany | . |

*Primary Examiner*—Joseph E. Valenza
*Attorney, Agent, or Firm*—Shefte, Pinckney & Sawyer

[57] ABSTRACT

An apparatus for orienting packages of textile material into predetermined individual orientations cooperates with a package delivery system which delivers packages in random orientations. The package orienting apparatus includes a device for classifying each package on the basis of a detectably different characteristic such as, for example, the characteristic that one respective end of the tube of the package has a larger diameter than the other tube end. A disposing device is operatively connected to the classifying device for moving each textile material package through a predetermined movement in response to the sensing of the detectably different characteristic to thereby bring the package into a predetermined individual orientation. The disposing device can include a drum having a pair of package receiving elements formed therein each along a respective radius of the drum and perpendicular to the other package receiving element. A control unit controls the drum motor to rotate the drum in a selected clockwise or counter-clockwise direction in response to sensing of the detectable characteristic of the package being received in the next available package receiving element to thereby orient all packages detected as having the same characteristic into the same individual orientation.

20 Claims, 4 Drawing Sheets

APPARATUS FOR INDIVIDUALLY ORIENTING TEXTILE PACKAGES IN RESPONSE TO SENSING OF THE INITIAL ORIENTATION OF THE PACKAGE

BACKGROUND OF THE INVENTION

The present invention relates to an apparatus for orienting packages of textile material in response to sensing of the initial orientation of the packages.

It is known to supply packages of textile material to a textile machine such as, for example, a textile winding machine by a supply arrangement in which the packages are transported in random orientations. Typically, all of the delivered packages must be oriented into the same predetermined orientation for successful winding or unwinding of yarn therefrom at the textile winding machine. The challenge of properly orienting the packages arises in those situations in which the packages comprise textile material built on a tube which has one end of a different diameter than its other end. In this situation, if, for example, the predetermined orientation of the packages is an orientation in which the larger diameter tube end is to be more remote than the lesser diameter tube end relative to the direction in which the textile material or yarn is drawn off of the package, an orienting apparatus must be provided to insure that each of the packages (which are delivered with their tube ends in random orientations) are uniformly oriented with their respective tube ends in the same predetermined orientation as the other packages.

German Patent Document DE-OS 33 45 825 discloses an apparatus in which randomly oriented packages are initially delivered by a package conveyor which advances the packages by vibration. Another component of the apparatus downstream from the vibrating package conveyor orients the packages in a predetermined orientation such as, for example, a vertical orientation with the same selected greater or lesser diameter tube end in the lower position. As required, the orienting component must move some of the packages through a predetermined movement to bring the proper greater or lesser diameter tube end of the package into the proper orientation and, for this reason, the cyclic operating time for such orienting apparatus typically are the highest among the elements which supply the packages to the textile machine, thereby creating a bottleneck. Accordingly, the need still exists for a package orienting apparatus which substantially reduces the time required to re-orient a package delivered in a random orientation into a predetermined orientation.

SUMMARY OF THE INVENTION

Briefly described, the present invention provides an apparatus for orienting packages of textile material into predetermined individual orientations, the packages being of the type having textile material built on a tube with one portion of the package having at least one detectably different characteristic than another portion of the package axially spaced from the one package portion The package orienting apparatus includes means for transporting packages along a delivery path to an orienting location and means for classifying each package on the basis of its detectably different characteristic. The transporting means is operable to deliver each package to the classifying means and the classifying means is operable to classify each package as either an end adjacent package having its one portion more closely adjacent a predetermined delivery path location than the other portion of the package or an end remote package having its one portion more remote from the predetermined delivery path location than the other portion of the package. Also, the transporting means is operable to transport each package from the classifying means to the orienting location in a manner in which each package arrives at the orienting location in the same disposition as other packages similarly classified by the classifying means.

The package orienting apparatus also includes means for disposing each package delivered to the orienting location in a predetermined individual orientation. The disposing means includes a first package supporting element and a second package supporting element disposed in generally perpendicular intersecting relation to one another and means for cyclically moving each of the package supporting elements. The package supporting elements are moved between a receipt position at which the package supporting element receives a package delivered to the orienting location and a discharge position in which a supported package is discharged from the disposing means, the receipt and discharge positions being disposed relative to one another such that the orientation of each supported package changes by an angle substantially equal to ninety degrees between the receipt and discharge positions. The cyclically moving means is operable to alternately move the first and second package supporting elements between the receipt and discharge positions with the first package supporting element being disposed at one of the receipt and the discharge positions while the second package supporting element is disposed at the other of the receipt and the discharge positions.

Further, the package orienting apparatus includes means for controlling the cyclically moving means to move the respective package supporting element at the receipt position to the discharge position by a selected one of a first movement of the respective package supporting element in which an end adjacent package supported by the respective package supporting element is discharged in the same predetermined orientation as the other end adjacent packages and a second movement of the respective package supporting element in which an end remote package supported by the respective package supporting element is discharged in the same predetermined orientation as the other end remote packages. The controlling means is operable to select the appropriate one of first and second movements in response to a signal from the classifying means indicating the respective end adjacent or end remote classification of the package which is to be moved from the receipt to the discharge position, whereby both the end adjacent and end remote packages can be disposed in the same predetermined orientation by movement of the respective package supporting element at the receipt position to the discharge position in a selected one of a clockwise and counterclockwise direction for discharge of end adjacent packages therefrom and movement of the respective package supporting element at the receipt position to the discharge position in the other of the clockwise and counterclockwise directions for discharge of end remote packages therefrom.

According to one feature of the package orienting apparatus, one end of each package tube is of greater diameter than the other end of the package tube with the one portion of each package being a selected one of the lesser diameter tube end and the greater diameter tube end and the classifying means includes means for detecting the presence or absence of the selected one of the lesser diameter tube end and the greater diameter tube end. The package orienting apparatus is therefore operable to orient packages in which the one portion of each package is the greater diameter tube end.

According to another feature of the package orienting apparatus, the transporting means delivers each package to the orienting location in a generally horizontal disposition and the cyclically moving means includes means for cyclically moving each of the first and second packages supporting elements between a generally horizontal receipt position and a generally vertical discharge position.

According to a further feature, the cyclically moving means includes a drum having an axis and being open at one axial end, and means for cyclically pivoting the drum about its axis. The first and second package supporting elements are formed in the drum generally transverse to one another generally along respective transverse radii of the drum, the open axial end of the drum being disposed for delivery of packages into the drum by the transporting means at the orienting location and the means for cyclically pivoting the drum being operable to cyclically pivot the first and second package supporting elements between the receipt and discharge positions. In one variation of the further feature of the package orienting apparatus, the apparatus also includes random orientation supply means for supplying packages to the transporting means with the one end of the packages being in random orientation with respect to the delivery path.

Preferably, the random orientation supply means includes a device for continuous groupwise delivery of packages and a device for individually dispensing packages to the transporting means, the individually dispensing device being operable to individually dispose each package received from the continuous groupwise delivery device in a ready to dispose location for individual dispensing of the package to the transporting means. Also, the transporting means preferably includes a shuttle device which cyclically shuttles between a pre-feed location at which it receives a package from the individually dispensing device and the orienting location at which the received package is released into the respective one of the first and second package supporting elements at the receipt position, the shuttle device being operable to advance a received package past the classifying means for classifying of the received package thereby.

In another variation of the further feature of the package orienting apparatus, the packages are delivered after being oriented to a further processing location by an assembly for independently delivering the oriented packages. The assembly includes a plurality of independently movable package support members each for individually supporting a package in a generally upright disposition, means for advancing package support members between a loading position adjacent the drum for receiving packages discharged therefrom and the further processing location, and means for selectively temporarily stopping a package support member at the loading position for loading of a package thereon discharged from the drum and wherein the disposing means includes means for supporting each package in a generally upright disposition upon discharge thereof from the discharge position for loading of the upright package onto an independently movable package support member at the loading position.

In another variation, the package orienting apparatus preferably includes means for supporting the drum above the advancing means such that each package supported by the drum at the discharge position is dropped from the drum onto an available package supporting member therebelow at the loading position. Moreover, the means for supporting each package in an upright disposition preferably includes a pair of chamber halves, each pivotally mounted for pivoting about a vertical axis, and means for pivoting the chamber halves between a chamber forming position in which the chamber halves form an open top chamber for guiding a package thereinto during its descent from the drum onto a package support member and an open position in which the chamber halves are spaced apart from one another for unblocked passage of a supported package therebetween.

In an additional variation of the further feature of the package orienting apparatus, the independently delivering assembly includes a sensor disposed adjacent the loading location for sensing the presence of a package on a package support member at the loading location. Also, the package orienting apparatus includes a sensor disposed adjacent the individually dispensing device for sensing the presence of a package in a ready to dispense location. Preferably, the package orienting apparatus includes as well a sensor for detecting the presence of a package at the pre-feed location and the disposing means includes means for sensing the rotational position of the drum. Thus, in the additional variation, the independently delivering assembly includes a sensor disposed adjacent the loading location for sensing the presence of a package on a package support member at the loading location, a sensor disposed adjacent the individually dispensing device for sensing the presence of a package in a ready to dispense location, a sensor for detecting the presence of a package at the pre-feed location, and means for sensing the rotational position of the drum. The sensors are connected to a control unit operatively connected to the individually dispensing device, the shuttle device, the drum and the selectively temporarily stopping means for controlling, in response to signals indicating the presence of a package at the ready to dispense location and a package at the pre-feed location and a signal indicating a rotational position of the drum and in sequential manner, the individually dispensing device to dispense a package to the pre-feed location and the shuttle device to shuttle a package from the pre-feed location to the orienting location.

In a further additional variation of the further feature of the package orienting apparatus, the shuttle device includes a package supporting surface for supporting a next following package at the pre-feed location during shuttle movement of the immediately prior package from the pre-feed location to the orienting location and during return movement of the shuttle device into position for subsequent shuttle movement of the next following package.

In yet another variation of the further feature of the package orienting apparatus, the continuous groupwise delivery device includes a vibrating floor for advancing movement of packages by vibration thereof and means for selectively varying the vibrating action of the vibrating floor to control the rate of supply of packages to the individually dispensing means.

DETAILED DESCRIPTION OF THE PREFERRED EMBODIMENT

Figure 1:
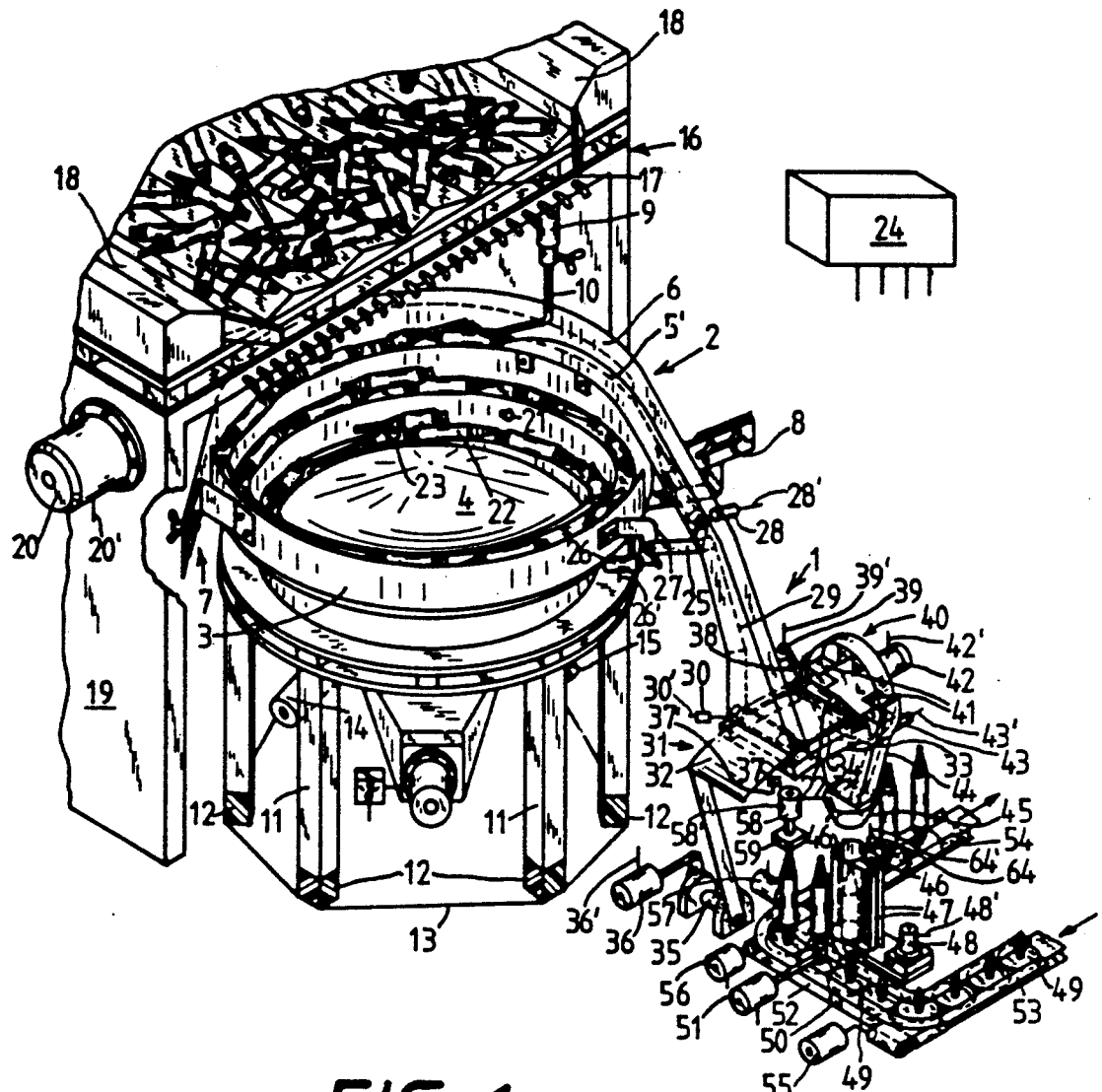
FIG. 1 is a perspective view of the package orienting apparatus of the present invention.
Figure 2:
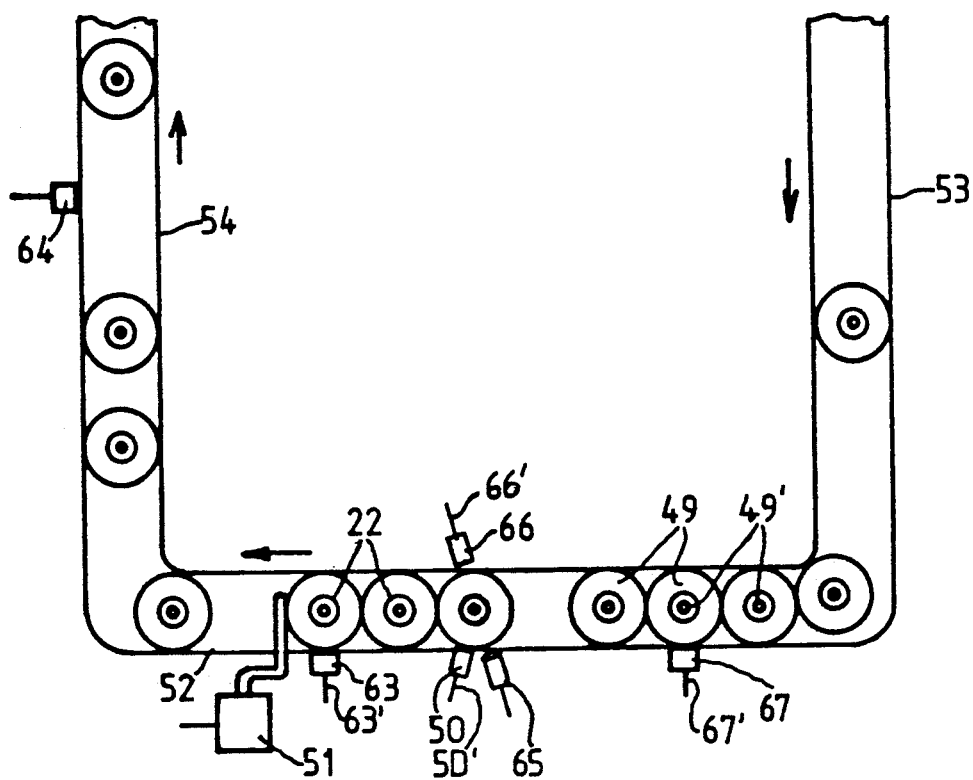
FIG. 2 is an enlarged top plan view of a portion of an assembly for individually delivering oriented packages from the package orienting apparatus to further processing locations.

In FIGS. 1-4, the preferred embodiment of the package orienting apparatus of the present invention is illustrated. The package orienting apparatus 1 is operable to orient packages of textile material into predetermined individual orientations and, in particular, is operable to orient a plurality of packages 22 of the type having textile material built on a tube with one portion of the package having at least one detectably different characteristic than another portion of the package axially spaced from the one package portion.

The package orienting apparatus 1 includes a means for transporting the packages 22 along a delivery path to an orienting location which includes a shuttle device 31 for cyclically shuttling the packages 22 along the delivery path to the orienting location. Also, the package orienting apparatus 1 includes means for classifying each package 22 on the basis of its detectably different characteristic, the classifying means including a mechanical sensor 38 and an actuator 39. Additionally, the package orienting apparatus 1 includes means for disposing each package delivered to the orienting location in a predetermined individual orientation, the disposing means including a first package supporting element and a second package supporting element disposed in generally perpendicular intersecting relation to one another. The first and second package supporting elements are preferably formed as channels in a drum 40.

The disposing means also includes means for cyclically moving each of the package supporting elements between a receipt position at which the package supporting element receives a package 22 delivered to the orienting location and a discharge position in which a supported package is discharged from the disposing means. The receipt and discharge positions are disposed relative to one another such that the orientation of each supported package 22 changes by an angle substantially equal to 90 degrees between the receipt and discharge locations. A cyclically moving means, which is preferably in the form of a rotary motor 42 operatively connected to a control unit 24, is operable to alternately move the first and second package supporting elements between the receipt and discharge positions with the first package supporting element being disposed at one of the receipt and the discharge positions while the second package supporting element is disposed at the other of the receipt and the discharge positions.

The package orienting apparatus 1 also includes random orientation supply means for supplying the packages 22 to the shuttle device 31 with the ends of the packages 22 being in random orientation with respect to the delivery path. The random orientation supply means includes a deice 16 for continuous groupwise delivery of the packages 22 and a device 2 for individually dispensing the packages 22 to the shuttle device 31. The individually dispensing device 2 is operable to individually dispose each package 22 received from the continuous groupwise delivery device 16 in a ready to dispose location adjacent a slide 29 for individual dispensing of the package 22 along the slide 29 to a prefeed location at which the shuttle device 31 engages the package for feeding to the orienting location.

The tube of each of the packages 22 has one end of greater diameter than its other end and the mechanical sensor 38 is operable to detect the presence or absence of a selected one of the lesser diameter tube end or the greater diameter tube end of each of the packages 22. The mechanical sensor 38, in cooperation with the actuator 39 and the control unit 24, classifies each of the packages 22 as either an end adjacent package having its one selected greater or lesser diameter end more closely adjacent a predetermined delivery path location than the other axial end of the tube of the package or, alternatively, as an end remote package having its selected one greater or lesser diameter tube end more remote from the predetermined delivery path location than the other axial tube end. The shuttle device 31 is operable to transport each of the packages 22 from the mechanical sensor 38 to the orienting location in a manner in which each package arrives at the oriented location in the same disposition as other packages similarly classified by the classifying means.

The control unit 24 controls the drum 40 to move the respective package supporting element at the receipt position to the discharge position by either a first movement of the respective package supporting element in which an end adjacent package supported therein is discharged in the same predetermined orientation as the other end adjacent packages previously oriented or in a second movement of the respective package supporting element in which an end remote package supported by the respective package supporting element is discharged in the same predetermined orientation as the other end remote packages previously oriented. The control unit 24 selectively controls the drum 40 to rotate about its axis in the appropriate one of the first and second movements (e.g., in a clockwise direction or a counter-clockwise direction) in response to a signal from the actuator 39 indicating the respective end adjacent or end remote classification of the package which is to be moved from the receipt to the discharge position. The mechanical sensor 38 is configured as desired to actuate the actuator 39 to provide a signal to the control unit 24 in the event that the greater diameter package tube end is sensed by the mechanical sensor or, alternatively, in the event that the lesser diameter package tube end is sensed by the mechanical sensor, with the respective one of the greater or lesser diameter package tube ends sensed by the mechanical sensor resulting in a classification of the respective package as an end adjacent or an end remote package. Accordingly, the package orienting apparatus 1 can be operated to dispose both end adjacent and end remote packages in the same predetermined orientation by, for example, movement of the respective package supporting element at the receipt position to the discharge position in a selected clockwise or counterclockwise direction for the discharge of end adjacent packages therefrom and movement of the respective package supporting element at the receipt position to the discharge position in the opposite clockwise or counter-clockwise direction for discharge of the end remote packages therefrom. Through operation of the package orienting apparatus 1 in this manner, all of the packages 22 can be uniformly oriented with the same respective greater or lesser diameter tube end in a chosen position such as, for example, all of the greater diameter package tube ends in a downward disposition for insertion onto the upright post or peg of an independently movable caddie for subsequent transport of the package to a further processing location.

The individually dispensing device 2 includes a centrifugal individualizing basin 3 having an upwardly conical floor 4. A conveyor belt 5 in the form of a three-dimensional spiral begins at this upwardly conical floor 4 and ends at a package output device located at a package gate 25. The packages 22 are moved along the conveyor belt 5, beginning at the upwardly conical floor 4 until they are in front of the package gate 25, by vibration of the centrifugal individualizing basin 3. The centrifugal individualizing basin 3 has legs 11 with rubber cushions 12 that are intended to absorb the vibrational motion. Since the dimensions of the centrifugal individualizing basin 3 and in particular the width of the conveyor belt 5 are typically fixed, the width of the conveyor belt must be made adjustable, at least in its last segment, so as to suit the dimensions of the particular packages 22 that are to be separated. To this end, an outer wall 6, which is of flexible material such as sheet metal, is positionally variable by means of fasteners 7 and 8. While a radial adjustment for the direct influence on the width at this point can be done at the fastener 8, shifting of this wall part 6 in the tangential direction can be done at the fastener 7, by means of an oblong slot not shown in further detail. This change in length of the wall element 6, combined with the radial adjustment at the fastener 8, leads directly to a change in the width of the guide path 5 along the entire route along which the wall element 6 is operative. The result achieved is that when packages 22 have shifted and are side by side, whichever package is located farthest inward drops back off the guide path 5, toward the upwardly conical floor 4.

An adjustable stripper 10 which is mounted in a fastener 9 is adjusted such that it can reject any packages pushed onto it. As a rule, however, that can happen only if remnant packages 23 having remaining yarn are also present along with fully-spun packages 22 in the centrifugal individualizing basin 3. Remnant packages may, for example, come from yarn batches that have been interrupted, or may have been rejected by a bobbin winder machine.

A window 21 is provided in the wall of the centrifugal individualizing basin 3, and a photosensor, not shown, is disposed behind the window. On the opposite side of the centrifugal individualizing basin 3, a light source, (not shown) that with this photosensor forms a photoelectric barrier is provided. As a result, constant monitoring of the fill level of the centrifugal individualizing basin 3 is performed. If the fill level drops below a minimum value, a motor 20 is put into operation and it sets a slightly inclined conveyor base 17 of a flat conveyor 16 to vibrating. As a result, the packages 22 located on this conveyor base 17 are gradually dropped into the centrifugal individualizing basin 3. After a short time, the motor 20 is turned off again, to avoid overfilling of the centrifugal individualizing basin 3.

A plurality of walls 18 are provided on both sides of the conveyor base 17 to keep the packages 22 on the conveyor base 17. The flat conveyor 16 is secured to a frame 19 that is connected to the basic machine frame 13.

An overall system that includes a dumping device for a package delivery cart, of the kind that can be delivered to the package delivery station 1, is described and illustrated in German Patent Disclosure Document DE-OS 30 45 824.

The operation of the package orienting apparatus 1 to individually orient the packages 22 which are initially supplied in random orientations by the random orientation supply means 16 with the greater diameter package tube ends in various, random orientations with respect to one another is as follows. As seen in FIG. 1, the packages 22 are advanced along the conveyor base 17 and dropped into the centrifugal individualizing basin 3 for outward movement of the packages 22 against the walls of the centrifugal individualizing basin 3. The packages 22 on the walls of the centrifugal individualizing basin 3 are successively advanced onto a guide path 5' at which a sensor 28 is disposed for controlling the feet of the packages to the shuttle device 31.

A sensor 28, which is disposed in front of the package gate 25, or in other words upstream in terms of the package transporting direction, communicates with a control unit 24 via a signal line 28'. This sensor 28 recognizes the arrival of a package 22 or remnant package 23 in front of the package gate 25. The signals of the sensor 28 are called up or retrieved in the control unit 24 at predetermined time intervals, as will be explained hereinafter, and as a function thereof, the package gate 25, pivotably supported on a fastener 27, is actuated via a solenoid 26. This solenoid 26 is connected to the control unit 24 via a control line 26'.

The package slide 29 is disposed downstream of the package gate 25 and ends within the pivoting range of the shuttle device 31. A further sensor 30 is disposed at this lower end of the package slide 29 and detects the arrival of a package at that end of the package slide 29. This sensor 30 is also connected to the control unit 24, via a signal line 30'.

If the arrival of a package 22 at the end of the slide 29 has not yet been detected by this sensor 30, at a time when the sensor 28 has already detected the arrival of a new package 22 in front of the package gate 25, for example, then the solenoid 26 is actuated by the control unit 24 via the control line 26', to close the package gate 25. In this way, the travel of two packages 22 at the same time in the package slide 29, which would preclude the proper passage of packages singly through the shuttle device 31, is avoided. In the normal situation, however, the package gate 25 need not be actuated, because after a package 22 has been dumped into the slide 29, the sensor 28 does not detect a new package until the preceding package has already reached the end of the slide, and hence the sensor 30. Depending on the spacing of the sensor 28 from the package gate 25, the control unit 24 can also delay the actuation of the solenoid 26 by a predetermined period of time. However, in each case this adjustment must be made such that whenever it is necessary to swivel the package gate 25 inward, this is done before the next package has arrived at the package gate 25. Otherwise, the package gate 25 might push the front end of that package up out of its path.

The adaptation of the conveying speed of the round package conveyor 2 to the transfer cycle of the succeeding units of the package delivery station as a rule assures operation without the aid of the package gate 25 for relatively long periods of time.

Each package 22 that has arrived at a rear portion 32 of the shuttle device is disposed in a horizontal position due to the configuration of the slide 29 which guides the packages 22 to the pre-feed location. In the view of FIG. 1, the shuttle device 31 has reached virtually its forwardmost position, in which with a shuttle device face 33 located toward its front, it loads a package into the drum 40. The package enters package supporting elements 41 inside the drum 40, which hold the package on both ends.

Figure 3:
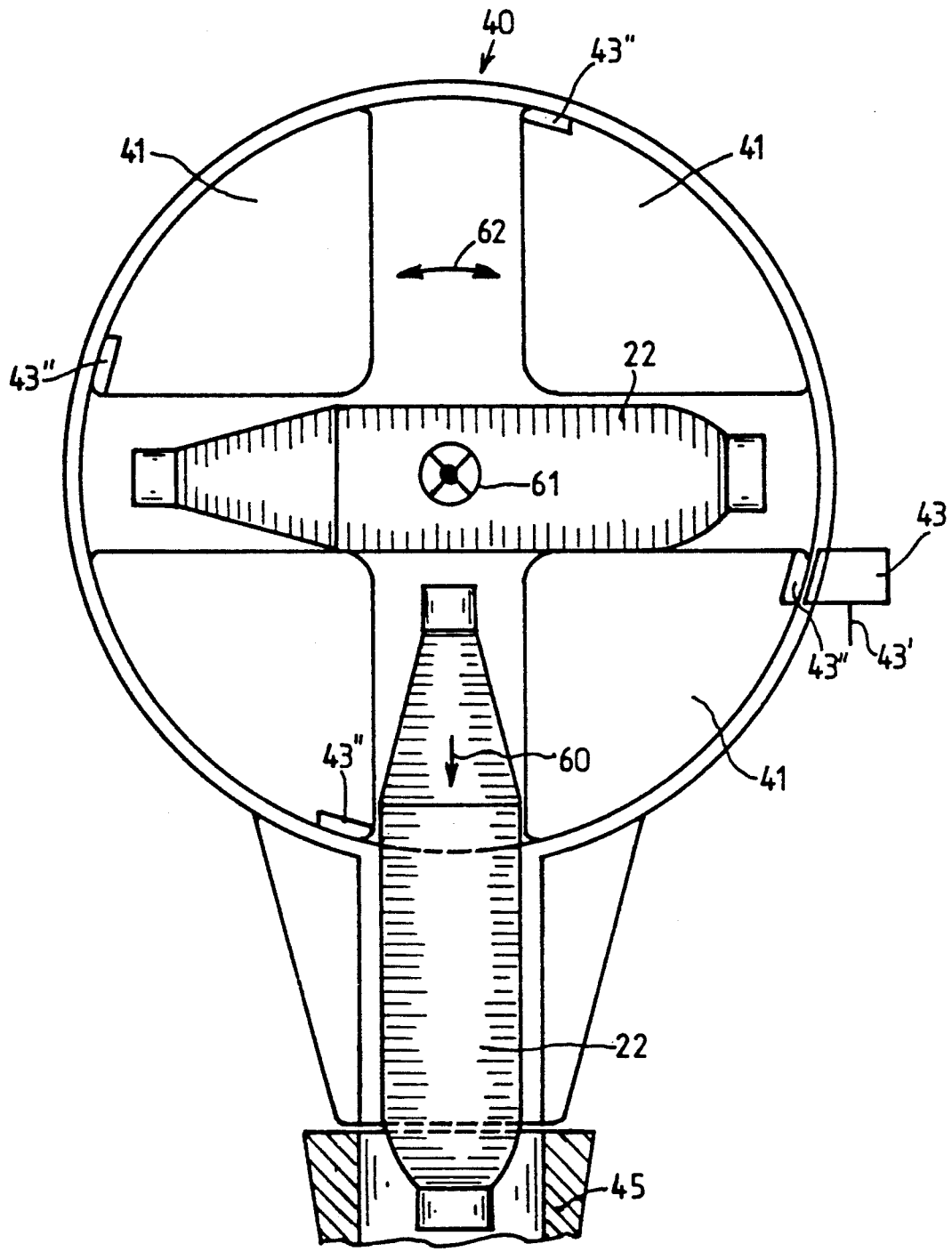
FIG. 3 is an enlarged side elevational view, in partial vertical section, of the means for disposing each package in a predetermined individual orientation of the package orienting apparatus shown in FIG. 1.

The drum 40, as seen in FIG. 3, includes an axis and is open at one axial end with the first and second package supporting elements being formed in the drum generally transverse to one another along respective transverse radii of the drum 40. The open axial end of the drum 40 is disposed for delivery of the packages 22 into the drum by the shuttle device 31.

The shuttle device 31 cyclically shuttles the packages 22 between the pre-feed location at which the packages are received from the individually dispensing device 2 and the orienting location at which each package 22 is released into the respective one of the first and second package supporting elements at the receipt position. The shuttle device 31 advances each package 22 past the mechanical sensor 38 for classifying of the package thereby.

Although a package has already arrived between the segments 46 of a guide chute on a caddie 49, or its post 49', as shown in FIG. 1, it is possible for the full operating capability of the package orienting apparatus to be assured if this package is just leaving the drum 40 moving downward (see FIG. 3). It need merely have dropped far enough that its rear end has left the middle part of the drum 40, so as not to hinder the horizontal insertion of the next package.

As shown in FIG. 1, the package 22, shifted by the shuttle device along slide rails 34, passes a mechanical sensor 38, which is deflected by the bottom end of the package 22 in such a way that it damps an actuator 39. This mechanical sensor 38 is disposed at a level such that it is deflected only by the package base, but not by the tip of the package. As a result, the actuator 39 is damped only in those cases in which the package assumes the position shown in FIG. 1. The actuator 39 is connected to the control unit 24 as well, via a signal line 39'.

If the actuator 39 is damped, then via a control line 42', the rotary motor 42 for the drum 40 is rotated counterclockwise by a one-quarter turn if a package request has been made. A sensor 37 is disposed in a position in which it detects the forwardmost position of the shuttle device 31 and reports it to the control unit 24 via a signal line 37'. If this position, which corresponds to the zero position of the shuttle device 31, has been reached, then this means that a package has been loaded into the drum 40. If that position has been reached and if a package request (to be explained hereinafter) has been made, then the motor 42 is actuated by the control unit 24, in order to effect the aforementioned quarter-turn of the drum 40.

If the actuator 39 is not damped during the advancement of the shuttle device 31, this is equivalent to the alignment of the package opposite the package position shown in FIG. 1. The motor 42 is therefore driven in the opposite direction by the control unit 24, in order to rotate the drum 40 by 90° in that direction. In this way, whichever package is located in the drum 40 is compulsorily guided during its rotation, and it leaves the drum 40 after attaining its vertical position, with its tip upward toward the package loading chute that is formed by the lower part of the housing 44 and a funnel 45 with the two chamber halves 46 located beneath it.

The position of the drum 40 at any time is monitored by a position sensor 43, which is likewise connected to the control unit 24, via a signal line 43'. This sensor 43 may for instance be a Hall sensor, which detects magnetic markings 43,, on the drum 40, which are staggered 90° apart.

The shuttle device 31 is actuated by a fluid cylinder 36 via a shuttle device drive mechanism 35. The fluid cylinder 36 is connected to the control unit 24 via a control line. This illustration is a simplified one, because normally valves that trigger the alternating delivery of fluid are triggered by the control unit 24. Naturally a motor with a crank drive or a solenoid may also be provided at this point. A crank drive has the advantage that one revolution corresponds to a double stroke of the shuttle device 31.

In the return stroke of the shuttle device 31, the package, resting on the back 32 of the shuttle device, slides onto slide rails 34 at the end of this shuttle device back 32. After the reversal of the stroke direction of the shuttle device 31, this package is carried along the slide rails 34 by the angled front shuttle device face 33 to the drum 40, past the mechanical sensor 38. Once the face 33 of the shuttle device 31 has left the region the mouth of the package slide 29, the shuttle device back 32 ready to receive a new package 22, which may already have been released at the upper end of the package slide 29 a suitable amount of time beforehand.

As seen in FIG. 1, the oriented packages 22 are delivered to a further processing location such as, for example, the winding stations of a textile winding machine, by an assembly for independently delivering the oriented packages The independently delivering assembly includes a plurality of independently movable package support members or caddies 49 each for individually supporting a package 22 in a generally upright disposition, means for advancing the caddies 49 between a loading position adjacent the drum 40 for receiving the packages 22 discharged therefrom and the further processing location, and means for selectively temporarily stopping a caddie at the loading position for loading of a package 22 thereon discharged from the drum. The disposing means of the package orienting apparatus 1 includes means for supporting each package in a generally upright disposition upon discharge thereof from the discharge position for loading of the upright package onto a caddie at the loading position. The means for supporting each package in a generally upright disposition upon discharge includes a housing 44, as seen in FIG. 1, and a pair of chamber halves 46, each pivotally mounted for pivoting about a vertical axis. Also, the means for supporting each package in a generally upright disposition includes means for pivoting the chamber halves 46 between the chamber forming position in which the chamber halves form an open top chamber for guiding a package 22 thereinto during its descent from the drum 40 onto a caddie and an open position in which the chamber halves 46 are spaced apart from one another for unblocked passage of a supported package 22 therebetween.

While the lower part of the housing 44 and the funnel 45 are rigidly disposed, the two loading chamber halves 46 are pivotable about vertically arranged pivot shafts 47. The openings of these two loading chamber halves 46 is effected immediately once the arrival of a package 22 on the post 49' of the caddie 49 located under the loading chute is detected To this end, as can be seen from FIG. 2, a photoelectric barrier is provided, which is formed by a light source 65 and a photosensor 66. The photosensor 66 is likewise connected to the control unit 24, via a signal line 66'. Further sensors 50, 63 and 67, by whose signal lines 50', 63' and 67', respectively, signals relating to the presence of caddies 49 can be forwarded to the control unit 24, are also disposed on the transport channel 52, which has a conveyor belt driven by a motor 56. If in this case the caddies used have a metal ring on their periphery, so that they can be controlled by electromagnets, for instance, then these sensors 50, 63 and 67 are preferably configured to operate on an inductive basis.

Upon the arrival of a package on the post 49, of a caddie 49, detected by the photosensor 66, in combination with a signal of the sensor 67 that an empty caddie is ready, all the units of the package delivery station are put into operation, so as to be capable of passing one package at a time on to the next unit. At the starting point of this circuit, one package 22 rests horizontally in the drum 40, one package rests on the back of the shuttle device 31, and one package is located at the upper end of the package slide 29. Upon the package arrival signal of the photosensor 66, the following devices are simultaneously actuated: a stopper 51 located downstream along the transport channel 52, via a control line 51'; a motor 48 for opening the loading chamber halves 46, via a control line 48; the motor 42 for rotating the drum 40, via a control line 42'; the fluid cylinder 36 for beginning the rearward stroke of the shuttle device 31, via a control line 36; and optionally the solenoid 26 for opening the package gate 25, via a control line 26', and optionally also the vibration motors 14 and 15, as described hereinafter.

Monitoring of all the units with suitable sensors serves not only to generate signals that directly cause controlling of the various package units, but also to check for the absence of any necessary signals. In the latter case, depending on at which particular time a particular signal is missing, the occurrence of a blockage is ascertained. Such a blockage causes all the units to stop immediately. As a rule, manual intervention is then necessary. The blockage report must also be manually canceled, after which the system goes back into operation.

For example, if no next caddie is detected at a specific instant at the sensor 67, then upon arrival of the package on the caddie position at this point, the signal of the photosensor 66 does not trip any package request If the sensor 50 still does not detect any caddie, at an time when a new caddie 49 should have arrived under the loading chute, then a blockage signal can be tripped. Similarly, by means of the sensor 63, a check is made as to whether new caddies have arrived at this point, or if after opening of the stopper 51 a removal of the caddie located there has been done. A further sensor 64 located farther downstream can also monitor whether the packages released by the stopper 51 have moved past it after a predetermined period of time.

Alternatively, it is also possible for a stopper, which releases one caddie 49 at a time, and onto which a new package has placed, to be mounted directly downstream of the loading chute. However, the stopper 51 may be disposed at a distance from the loading chute, such that one of the backed-up caddies is located directly under the loading chute, and this can also be adjusted very exactly.

As can be seen in particular from FIG. 1, a plurality of resiliently deformable tube retaining clips are individually mounted on the posts 49' of the caddies 49 to assure a firm seat of the packages on the caddies. This firm seat of the packages has advantages at bobbin winder stations at which a change in the position of the package on the post is undesirable. Examples would be caddie rotating stations in yarn end preparing equipment, in which the caddies are supposed to be driven but the packages are to be rotated. Moreover, these resiliently deformable tube retaining clips secure the packages in the unwinding position on the post.

To facilitate the insertion of each package, which is initially slipped loosely onto the post, all the way onto the resiliently deformable tube retaining clip of the post, a shuttle device 59 is disposed in the stopper 51; it is actuated by a fluid cylinder 58 and pushes the packages all the way onto the post. This fluid cylinder is likewise triggered by the control unit 24, if the arrival and stopping of a caddie has been reported via the sensor 63 and its signal line 63'. The two transport channels 53 and 54 adjoining the transport channel 52 may for example lead to a package overpass, passing overhead across a service corridor. The tubes slipped onto the caddies 49 and arriving from the bobbin winder can be doffed in the region of this package overpass, so that only empty caddies 49 arrive at the end of the transport channel 53. A conveyor belt that is driven over a deflection roller by a motor 55 extends within the transport channel 53. A conveyor belt disposed in the transport channel 54 is driven via a motor 57.

The embodiment of a closed caddie loop in the bobbin winder, which extends as far as the package delivery station 1 described, assures that package delivery is adapted to the package demand, because empty caddies arrive only once the corresponding packages have been wound.

FIG. 3 shows an enlarged front view of the drum 40 that forms the package invertor An arrow 60 indicates that a package 22 is just now leaving the drum 40 between the two guides 41 and passing downward toward the funnel 45, thus leaving the package loading chute. At the same time, as indicated by the arrow 61, a new package is loaded (by the shuttle device 31) horizontally between guides 41 the double arrow 62 indicates that the rotary direction of the drum 40 is controllable as a function of the alignment of the loaded package. A Hall sensor 43 is arranged such that it can detect magnets 43", which are spaced apart by 90°. This Hall sensor 43 thus detects that one of the four basic positions of the drum 40 is attained at a given time.

Figure 4:
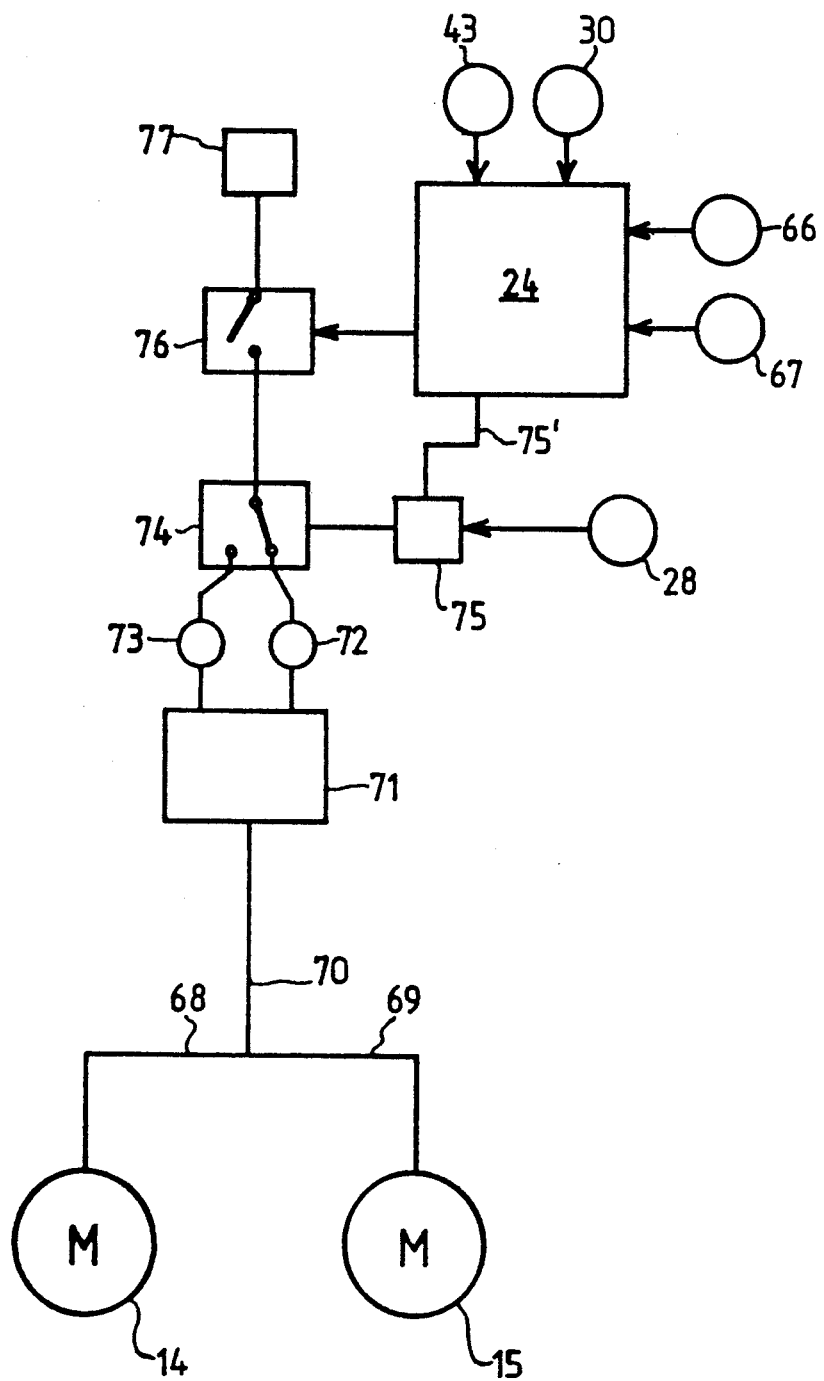
FIG. 4 is a schematic representation of the circuit for controlling the continuous groupwise delivery device of the package orienting apparatus shown in FIG. 1.

The control of the two unbalance motors 14 and 15 for the round package conveyor will now be explained as well, in conjunction with FIG. 4.

The two motors 14 and 15 are connected to a frequency converter 71 by current supply lines 68 and 69, via a common current supply line 70. This common supply by the frequency converter 71 assures synchronized operation of the two motors 14 and 15. These two motors are preferably a synchronous motors. The synchronized operation is absolutely necessary for function of the system. On the one hand, the vertical and tangential components must cooperate, thereby reinforcing one another, but on the other the radial components must counteract one another, so that they can cancel one another out.

The frequency converter 71 is driven via two potentiometers 72 and 73, which are connected selectively by a switchover relay 74. These potentiometers control the applicable output frequency of the frequency converter 71. They can be adjusted in analog fashion by hand. In any case, it is of course possible to display the frequencies assigned to the various analog voltage values via a digital display. It is moreover possible to assign the voltage values to the various frequencies by way of tables. However, this assignment depends on the dimensions of the unbalance masses, and of the round conveyor itself.

The potentiometer 73 is intended here for the lower of two alternative frequencies and hence rpm stages, while the potentiometer 72 is intended for the upper frequency. The switchover relay 74 is connected to a timing switch 75, which in turn is supplied with sensor signals from the sensor 28 and with control signals from the control unit 24 via a control line 75'. The sensor 28 detects whenever, after the release of a package, a new package has arrived in front of the package gate 25. The timing switch 75 may be integrated directly into the control unit 24.

In normal operation—in other words with uninterrupted cyclical package requests—the two motors 14 and 15 are operated continuously at the higher rpm stage, to assure rapid conveying of the packages 22 along the guide path 5'. However, if, for example, the package gate 25 is moved into its blocking position, either because the package request is delayed or the sensor 30 is delayed in indicating the arrival of a package at the end of the package slide 29, then if the higher rpm of the two motors 14 and 15 is maintained, a backup of packages may occur in front of the package gate 25. Moreover, damage to the packages can occur if they have a conveying force imparted to them by the vibrational motion in the conveying direction, yet cannot be conveyed onward because of the backup. To avoid such a backup situation, a switchover is made via the switchover relay 74 to the potentiometer 73, which produces a lower frequency stage in the frequency converter 71. This reduces the vibrational motion to such an extent that the packages no longer receive any notable force component in the conveying direction. On the other hand, if no package request is made for a relatively long period of time, which can be indicated by the sensors 30, 43, 66 or 67, then the control unit 24 actuates a switch 76 that cuts off the supply of electricity completely from an electrical supply source 77. The two unbalance motors 14 and 15 are braked and stopped as a result.

In summary, it can be stated that all the units of the package delivery station can be adapted to one another, via a central control means, in such a way that a maximum package delivery capacity is attainable. A particularly significant factor is that by means of the sensor monitoring, triggering can be done such that the various units can be driven simultaneously in such a way that the course of motion is adapted to the travel of the various packages.

The package orienting apparatus of the present invention thus provides a package delivery station with an increased capacity for delivering packages from the randomly arranged reserve supply to the package conveyor means of the bobbin winder machine. The invention is based on the recognition that shortening the cycle time of package delivery by means of the package delivery station can be done only if all the units that form the package delivery station and transfer the packages in succession to the next unit themselves all have very short indexing times. Above all, the applicable cycle time of the various units must be adhered to very precisely. In the known equipment, the package invertor has been a bottleneck among the various units. As a result of the embodiment according to the invention, in principle the package invertor need make only a one-quarter turn, and reloading it can already begin before a package has entirely left the package invertor toward the loading chute.

By means of a shuttle device, the delivery of packages can also be timed very accurately, with short cycles. Opening and closing the segments of the loading chute by swiveling them about one or more vertical axes can likewise be done very rapidly, because a relatively small swiveling radius can be adhered to. The transport speed of the conveyor belt, along with its surface structure, which jointly determines the force by which the caddies are carried along, should be adapted to assure rapid removal of the caddies from the loading chute.

Monitoring all the units of the package delivery station with sensors makes it possible to start all these units simultaneously when a package is requested; one package is already in reserve at each unit. During continuous package delivery as well, all the units of the package delivery station are actuated simultaneously. This assures that the packages will arrive in very close succession and also that package delivery will be adapted to the high processing capacity of the bobbin winder machine.

With the shuttle device, it is possible, while one package is being loaded into the package invertor, to receive a new package on the bearing face of the shuttle device. As a result, a package can also be transferred from the round package conveyor into the package slide in very timely fashion, because that package can be received on the aforementioned bearing face of the shuttle device without difficulty.

Operating the unbalance motors of the vibration drive mechanism of the round package conveyor as a function of package demand via a frequency converter in various rpm stages also enables an exact adaptation of the delivery capacity of the round conveyor to the cycle sequence of succeeding units in the package delivery station.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. An apparatus for orienting packages of textile material into predetermined individual orientations, the packages being of the type having textile material built on a tube with one portion of the package having at least one detectably different characteristic than another portion of the package axially spaced from the one package portion, comprising:

means for transporting packages along a delivery path to an orienting location;

means for classifying each package on the basis of its detectably different characteristic, the transporting means being operable to deliver each package to the classifying means and the classifying means classifying each package as either an end adjacent package having its one portion more closely adjacent a predetermined delivery path location than the other portion of the package or an end remote package having its one portion more remote from the predetermined delivery path location than the other portion of the package, the transporting means being operable to transport each package from the classifying means to the orienting location in a manner in which each package arrives at the orienting location in the same disposition as other packages similarly classified by the classifying means; and means for disposing each package delivered to the orienting location in a predetermined individual orientation, the disposing means including:

a first package supporting element and a second package supporting element disposed in generally perpendicular intersecting relation to one another, each package supporting element having an open end through which a package travels to exit the package supporting element;

means for cyclically moving each of the package supporting elements between a receipt position at which the package supporting element receives a package delivered to the orienting location and a discharge position in which a supported package is discharged from the respective package supporting element through the open end thereof at least partially due to the operation of gravity on the package, the receipt and discharge positions being disposed relative to one another such that the orientation of each supported package changes by an angle substantially equal to ninety degrees between the receipt and discharge positions, the cyclically moving means being operable to alternately move the first and second package supporting elements between the receipt and discharge positions with the first package supporting element being disposed at one of the receipt and the discharge positions while the second package supporting element is disposed at the other of the receipt and the discharge positions, and means for controlling the cyclically moving means to move the respective package supporting element at the receipt position to the discharge position by a selected one of a first element in which an end adjacent package supported by the respective package supporting element is discharged in the same predetermined orientation as the other end adjacent packages and a second movement of the respective package supporting element in which an end remote package supported by the respective package supporting element is discharged in the same predetermined orientation as the other end remote packages, the controlling means being operable to select the appropriate one of first and second movements in response to a signal from the classifying means indicating the respective end adjacent or end remote classification of the package which is to be moved from the receipt to the discharge position, whereby both the end adjacent and end remote packages can be disposed in the same predetermined orientation by movement of the respective package supporting element at the receipt position to the discharge position in a selected one of a clockwise and counterclockwise direction for discharge of end adjacent packages therefrom and movement of the respective package supporting element at the receipt position to the discharge position in the other of the clockwise and counterclockwise directions for discharge of end remote packages therefrom.

2. An apparatus for orienting packages of textile material according to claim 1 wherein one end of each package tube is of greater diameter than the other end of the package tube with the one portion of each package being a selected one of the lesser diameter tube end and the greater diameter tube end and the classifying means includes means for detecting the presence or absence of the selected one of the lesser diameter tube end and the greater diameter tube end.

3. An apparatus for orienting packages of textile material according to claim 2 wherein the one portion of each package is the greater diameter tube end.

4. An apparatus for orienting packages of textile material according to claim 2 wherein the transporting means delivers each package to the orienting location in a generally horizontal disposition and the cyclically moving means includes means for cyclically moving each of the first and second packages supporting elements between a generally horizontal receipt position and a generally vertical discharge position.

5. An apparatus for orienting packages of textile material according to claim 2 wherein the cyclically moving means includes a drum having an axis and being open at one axial end, and means for cyclically pivoting the drum about its axis, the first and second package supporting elements being formed in the drum generally transverse to one another generally along respective transverse radii of the drum, the open axial end of the drum being disposed for delivery of packages into the drum by the transporting means at the orienting location and the means for cyclically pivoting the drum being operable to cyclically pivot the first and second package supporting elements between the receipt and discharge positions.

6. An apparatus for orienting packages of textile material according to claim 5 and further comprising random orientation supply means for supplying packages to the transporting means with the one end of the packages being in random orientation with respect to the delivery path.

7. An apparatus for orienting packages of textile material according to claim 6 wherein the random orientation supply means includes a device for continuous groupwise delivery of packages and a device for individually dispensing packages to the transporting means, the individually dispensing device being operable to individually dispose each package received from the continuous groupwise delivery device in a ready to dispose location for individual dispensing of the package to the transporting means.

8. An apparatus for orienting packages of textile material according to claim 7 wherein the transporting means includes a shuttle device which cyclically shuttles between a prefeed location at which it receives a package from the individually dispensing device and the orienting location at which the received package is released into the respective one of the first and second package supporting elements at the receipt position, the shuttle device being operable to advance a received package past the classifying means for classifying of the received package thereby.

9. An apparatus for orienting packages of textile material according to claim 8 wherein the packages are delivered after being oriented to a further processing location by an assembly for independently delivering the oriented packages, the assembly having a plurality of independently movable package support members each for individually supporting a package in a generally upright disposition, means for advancing package support members between a loading position adjacent the drum for receiving packages discharged therefrom and the further processing location, and means for selectively temporarily stopping a package support member at the loading position for loading of a package thereon discharged from the drum and wherein the disposing means includes means for supporting each package in a generally upright disposition upon discharge thereof from the discharge position for loading of the upright package onto an independently movable package support member at the loading position.

10. An apparatus for orienting packages of textile material according to claim 9 and further comprising means for supporting the drum above the advancing means such that each package supported by the drum at the discharge position is dropped from the drum onto an available package supporting member therebelow at the loading position and the means for supporting each package in an upright disposition includes a pair of chamber halves, each pivotally mounted for pivoting about a vertical axis, and means for pivoting the chamber halves between a chamber forming position in which the chamber halves form an open top chamber for guiding a package thereinto during its descent from the drum onto a package support member and an open position in which the chamber halves are spaced apart from one another for unblocked passage of a supported package therebetween.

11. An apparatus for orienting packages of textile material according to claim 10 wherein the independently delivering assembly includes a sensor disposed adjacent the loading location for sensing the presence of a package on a package support member at the loading location.

12. An apparatus for orienting packages of textile material according to claim 10 and further comprising a sensor disposed adjacent the individually dispensing device for sensing the presence of a package in a ready to dispense location.

13. An apparatus for orienting packages of textile material according to claim 10 and further comprising a sensor for detecting the presence of a package at the pre-feed location.

14. An apparatus for orienting packages of textile material according to claim 10 wherein the disposing means includes means for sensing the rotational position of the drum.

15. An apparatus for orienting packages of textile material according to claim 10 and further comprising the independently delivering assembly includes a sensor disposed adjacent the loading location for sensing the presence of a package on a package support member at the loading location, a sensor disposed adjacent the individually dispensing device for sensing the presence of a package in a ready to dispense location, a sensor for detecting the presence of a package at the pre-feed location, means for sensing the rotational position of the drum, and a control unit operatively connected to the individually dispensing device, the shuttle device, the drum and the selectively temporarily stopping means for controlling, in response to signals indicating the presence of a package at the ready to dispense location and a package at the pre-feed location and a signal indicating a rotational position of the drum and in sequential manner, the individually dispensing device to dispense a package to the pre-feed location and the shuttle device to shuttle a package from the pre-feed location to the orienting location.

16. An apparatus for orienting packages of textile material according to claim 10 wherein the individually dispensing device includes means for controlling the dispensing of packages such that a predetermined period of time lapses between the arrival of each successive package at the pre-feed location.

17. An apparatus for orienting packages of textile material according to claim 15 wherein the control unit controls the respective advancements of the packages to the ready to dispense location and the pre-feed location in response to a signal from the sensor adjacent the loading location indicating the loading of a package onto a package support member.

18. An apparatus for orienting packages of textile material according to claim 10 wherein the shuttle device includes a package supporting surface for supporting a next following package at the pre-feed location during shuttle movement of the immediately prior package from the pre-feed location to the orienting location and during return movement of the shuttle device into position for subsequent shuttle movement of the next following package.

19. An apparatus for orienting packages of textile material according to claim 10 wherein the continuous groupwise delivery device includes a vibrating floor for advancing movement of packages by vibration thereof and means for selectively varying the vibrating action of the vibrating floor to control the rate of supply of packages to the individually dispensing means.

20. An apparatus for orienting packages of textile material into predetermined individual orientations, the packages being of the type having textile material built on a tube with one portion of the package having at least one detectably different characteristic than another portion of the package axially spaced from the one package portion, comprising:
means for transporting packages along a delivery path to an orienting location;
means for classifying each package on the basis of its detectably different characteristic, the transporting means being operable to deliver each package to the classifying means and the classifying means classifying each package as either an end adjacent package having its one portion more closely adjacent a predetermined delivery path location than the other portion of the package or an end remote package having its one portion more remote from the predetermined delivery path location than the other portion of the package, the transporting means being operable to transport each package from the classifying means to the orienting location in a manner in which each package arrives at the orienting location in the same disposition as other packages similarly classified by the classifying means; and means for disposing each package delivered to the orienting location in a predetermined individual orientation, the disposing means including:

a first package supporting element and a second package supporting element disposed in generally perpendicular intersecting relation to one another;

means for cyclically moving each of the package supporting elements about a pivot axis between a receipt position at which the package supporting element receives a package delivered to the orienting location and a discharge position in which a supported package is discharged from the disposing means in a radial direction relative to the pivot axis, the receipt and discharge positions being disposed relative to one another such that the orientation of each supported package changes by an angle substantially equal to ninety degrees between the receipt and discharge positions, the cyclically pivoting means being operable to alternately move the first and second package supporting elements between the receipt and discharge positions with the first package supporting element being disposed at one of the receipt and the discharge positions while the second package supporting element is disposed at the other of the receipt and the discharge positions, and means for controlling the cyclically moving means to move the respective package supporting element at the receipt position to the discharge position by a selected one of a first movement of the respective package supporting element in which an end adjacent package supported by the respective package supporting element is discharged in the same predetermined orientation as the other end adjacent packages and a second movement of the respective package supporting element in which an end remote package supported by the respective package supporting element is discharged in the same predetermined orientation as the other end remote packages, the controlling means being operable to select the appropriate one of first and second movements in response to a signal from the classifying means indicating the respective end adjacent or end remote classification of the package which is to be moved from the receipt position to the discharge position, whereby both the end adjacent and end remote packages can be disposed in the same predetermined orientation by movement of the respective package supporting element at the receipt position to the discharge position in a selected one of a clockwise and counterclockwise direction for discharge of end adjacent packages therefrom and movement of the respective package supporting element at the receipt position to the discharge position in the other of the clockwise and counterclockwise directions for discharge of end remote packages therefrom.

* * * * *